Feb. 18, 1947. L. W. CHUBB 2,416,155
POSITION LOCATOR
Filed March 27, 1943 5 Sheets-Sheet 1

WITNESSES:
Leon M. Garman

INVENTOR
Lewis W. Chubb.
BY
ATTORNEY

INVENTOR
Lewis W. Chubb.
ATTORNEY

Patented Feb. 18, 1947

2,416,155

UNITED STATES PATENT OFFICE 2,416,155

POSITION LOCATOR

Lewis W. Chubb, Pittsburgh 21, Pa., assignor to Westinghouse Electric Corporation, East Pittsburgh, Pa., a corporation of Pennsylvania Application March 27, 1943, Serial No. 480,777

14 Claims. (Cl. 250—1)

1

This invention relates to position locating apparatus and more particularly to such apparatus adapted for use in determining the position of objects moving relative to a locating station, such as ships, airplanes, tanks, etc. It has for one of its objects to provide improved apparatus for determining the position of objects.

Another object is to provide improved apparatus whereby waves directed from a wave generator or transmitter and subsequently reflected from the object to be located back to a receiver or detector may be utilized to accurately determine the position of the object.

A further object is to provide improved apparatus whereby the relative movement between a stationary receiving station and a moving object is utilized in connection with radiated and reflected waves to accurately determine the position of the moving object.

A still further object is to provide improved apparatus which permits of the use of the binaural sense of the operator in connection with radiated and reflected alternating waves to accurately determine the position of distant objects.

A still further object is to provide improved apparatus for accurately locating a distant object whereby waves radiated from a wave transmitter are mixed with waves reflected from the distant object, and the subsequent beat note utilized to accurately determine the position of the object.

A still further object is to provide improved apparatus having an antenna system which may be utilized in one position for approximately locating a distant object, and may be moved to another position, in which position it is utilized to determine more nearly the exact position of the object.

These and other objects will be apparent from the following description taken in conjunction with the accompanying drawings wherein.

2

Figure 1:
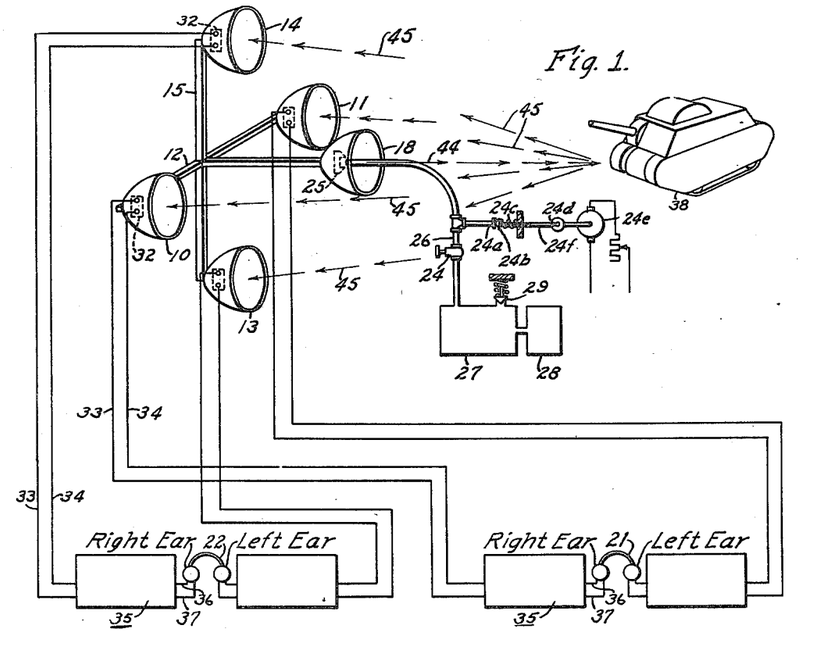
Fig. 1 is a view, partly in perspective and partly schematic, illustrating one embodiment of the invention, whereby sonic or supersonic waves are utilized to locate the position of a distant object.
Figure 2:
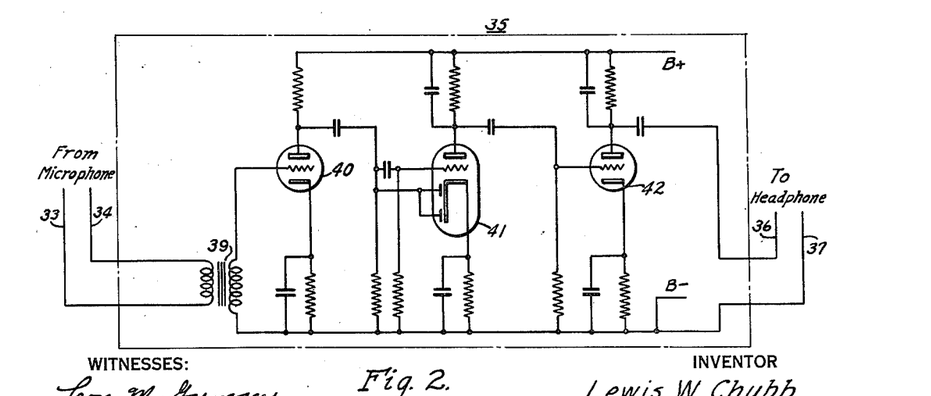
Fig. 2 is a schematic diagram of one of the receivers used with the apparatus shown in Fig. 1.

Referring to the drawings, Figs. 1 and 2 illustrate generally one embodiment of this invention wherein continuous sonic or supersonic waves are utilized to locate a distant moving object, such as an airplane, tank, ship, or the like. To locate a distant moving object with this apparatus, the area which is believed to include the object sought is scanned with a highly directive beam of sonic or supersonic waves. These waves, upon striking the object, are scattered and reflected back to a plurality of detectors or receivers located near the source of direct waves. The reflected waves are combined with a portion of the direct waves and the beat frequency produced by this combination is utilized to excite the binaural sense of an operator to accurately locate the position of the object in azimuth and elevation.

The apparatus illustrated in Fig. 1 includes a directive antenna system comprising an array of two wave gathering or receiving parabolic reflectors 10 and 11 spaced apart in azimuth on a supporting member 12 and two wave gathering or receiving parabolic reflectors 13 and 14 spaced apart in elevation on a separate supporting member 15 for receiving the reflected waves, and a transmitting parabolic reflector 18. The receiving reflectors are all located in the same plane and disposed equal distance and equal angularly about a center-line perpendicular to the plane. The transmitting parabolic reflector 18 is disposed on this center line forwardly of this same plane. A set of headphones 21 is connected to the azimuth-receiving reflectors 10 and 11, and another set of headphones 22 is connected to the elevation receiving reflectors 13 and 14.

There is one operator for each pair of receiving reflectors, the azimuth operator listening through the headphones 21, and the elevation operator listening through the headphones 22. Although no means has been illustrated for moving the reflectors, it is understood that all of the receiving reflectors and the transmitting reflector are to be suitably mounted so that they all move together in azimuth and elevation. It is also understood that although parabolic reflectors have been shown for transmitting the direct waves and for receiving the reflected waves, any suitable horn, reflector, or other directive device may be used without changing the scope of the invention.

The transmitting reflector 18 may be of any suitable size; however, it has been found that a reflector of about 30 centimeters in diameter gives very good results. Continuous sound waves are produced at approximately the focal point of the reflector 18 by an air-jet sound-wave generator 25. This generator is supplied with air through a tube 26 connected to an air reservoir 27 which is kept under substantially constant pressure by an air compressor 28 and a pressure regulating valve 29. Some suitable means, such as a valve 24, may be provided for controlling the wave generator 25. This generator produces a carrier frequency of approximately 10,000 cycles per second, and with this specific frequency and a reflector 30 centimeters in diameter, it has been found that the diagram of the polar beam of the reflector 18 is fairly narrow, approximately 5 degrees. This narrow beam insures very accurate location of the object sought.

For determining the distance from the locating station to the moving object it may be desirable to "pulse" the transmitter output and to measure the time required for a pulse to reach the moving object and return. Pulsing of the air-jet sound-wave generator conveniently may be effected by intermittently dropping the pressure of the air supplied thereto.

In Fig. 1, an air outlet 24a is provided between the valve 24 and the wave generator 25. This outlet normally is closed by a valve 24b which is biased into its closed position by means of a spring 24c. The valve is operated by a suitable cam mechanism which may take the form of an eccentric pin 24d mounted on a shaft that is rotated by an electric motor 24e. The eccentric pin is connected to the valve 24b by means of a link 24f.

When the valve 24b is opened the pressure of the air supplied to the wave generator 25 drops sufficiently to interrupt the production of waves thereby. Consequently, when the motor 24e is energized to rotate the eccentric 24d at a suitable rate, waves are transmitted from the wave generator 25 in pulses. The time required for a pulse to travel to the moving object and return to the locating station is a function of the distance therebetween.

The receiving reflectors 10, 11, 13 and 14 are all identical and are approximately the same size as the transmitting reflector 18. A suitable detecting device, such as a microphone 32, is located at approximately the focus of each of the receiving reflectors for detecting the reflected waves.

The microphone in the azimuth-locating reflector 10 is connected through conductors 33 and 34 to a receiver 35, the output of which is connected by conductors 36 and 37 to the headphone for the right ear (Fig. 1) of the set of headphones 21, and, likewise, the microphone in the azimuth-locating reflector 11 is connected through similar conductors and an identical receiver to the headphone for the left ear of the set of headphones 21. The microphones in the elevation-locating reflectors 13 and 14 are also likewise connected to the headphones for the left and right ears (Fig. 1), respectively, of the set of headphones 22, through similar conductors and identical receivers.

As stated above, all of the receivers indicated in Fig. 1 are identical, and for the purpose of illustration, only one receiver is illustrated in detail in Fig. 2. Each receiver 35 includes a transformer 39, a triode type tube 40 which provides a stage of high frequency amplification, a multiple electrode tube 41, which serves as a rectifier and also provides a stage of audio-frequency amplification, and another triode-type tube 42, which provides a final stage of audio-frequency amplification. The receiver is connected to its respective microphone 32 through the conductors 33 and 34 which connect to the primary of the transformer 39. The output from the receiver is connected to one of the headphones by the conductors 36 and 37.

To locate an object with the apparatus shown in Figs. 1 and 2, the sound-wave generator 25 is set into continuous operation by opening the valve 24, and the transmitting reflector 18 is pointed in the general direction in which it is believed that the object is situated. Most of the sound waves generated by the wave generator 25 are directed outwardly by the reflector 18, along a path indicated by the arrows 44 in Fig. 1, in a narrow beam; however, a small amount of the direct waves passes directly to the receiving reflector. The array of reflectors is then rotated in azimuth and elevation until the object that it is desired to locate is contacted. When the waves 44 contact an object, such as a moving tank 38 (Fig. 1), they are scattered and some of them are reflected by the object, along the paths indicated by the arrows 45 (Fig. 1), back to the receiving reflectors. Because the object is moving, the reflected waves 45 will be of different frequency than the waves that are transmitted directly to the receiving reflectors, the difference in frequency being proportional to the component of velocity parallel to the transmitted waves represented by the arrows 44.

The reflected and direct waves picked up by the microphones 32 and fed to the receivers 35. In the receivers, they are amplified by the tube 40, then they are detected to produce beats of audible frequency, and further amplified by the tube 41. The beat notes are further amplified by the tube 42 and fed to the two sets of headphones 21 and 22 to excite the binaural sense of the operators.

If the transmitting reflector 18 points directly at the tank 38, the receiving reflectors 10 and 11 will be equal distances from the tank and the reflected waves picked up by the reflectors 10 and 11 will be in phase. This causes the beat notes fed to the respective headphones of the set of headphones 21 to be in phase and of equal magnitude. In this instance, the signal appears to remain stationary in the center of the operator's head, which indicates to the operator that the reflector 18 is pointing directly at the tank.

If the transmitting reflector 18 is shifted, from pointing directly at the tank, so that it points slightly to the left of the direction of the tank, the receiving reflector 10 will be closer to the tank than the receiving reflector 11 and the reflected wave picked up by the reflector 10 will be slightly advanced in phase and the reflected wave picked up by the reflector 11 will be retarded in phase by an equal amount. The amount of phase shift is proportional to the difference in the echo paths from the tank 38 to the reflectors 10 and 11. In this instance, the signal appears to move from the center of the head of the operator wearing the azimuth headphones towards his right ear. Accordingly, if the transmitting reflector 18 is shifted, from pointing directly at the tank, so that it points slightly to the right of the direction of the tank, the receiving reflector 11 will be closer to the tank than the receiving reflector 10, and the reflected wave picked up by the reflector 11 will be slightly advanced in phase and the reflected wave picked up by the reflector 10 will be slightly retarded in phase. In this instance, the signal appears to move from the center of the operator's head towards his left ear.

To accurately focus the system on a distant object, the azimuth operator merely rotates the array of reflectors in azimuth until a signal is received in the headphones 21, then he manipulates the reflectors to the right or left until the signal appears to remain stationary in the center of his head.

To accurately locate an object in elevation, the elevation operator manipulates the array of reflectors in elevation in a like manner until the signal received in the headphones 22 appears to remain stationary in the center of his head.

There will be a phase shift of one complete cycle of the beat note in the headphones for each half carrier wavelength of motion of the receiving reflectors. With supersonic waves of 10,000 cycles having a wavelength of around 3 centimeters, the frequency of the beat note will be in a good range to be heard when the approach or retreat of an object, such as a tank, is above 10 M. P. H.

It is understood that reflections from stationary objects, such as trees, hills, buildings, and the like, will not give a signal since the reflected waves will be of the same frequency as the direct waves that are transmitted directly to the receiving reflectors, and, consequently, no beat note will be created to excite the binaural sense of the operators.

Figure 3:
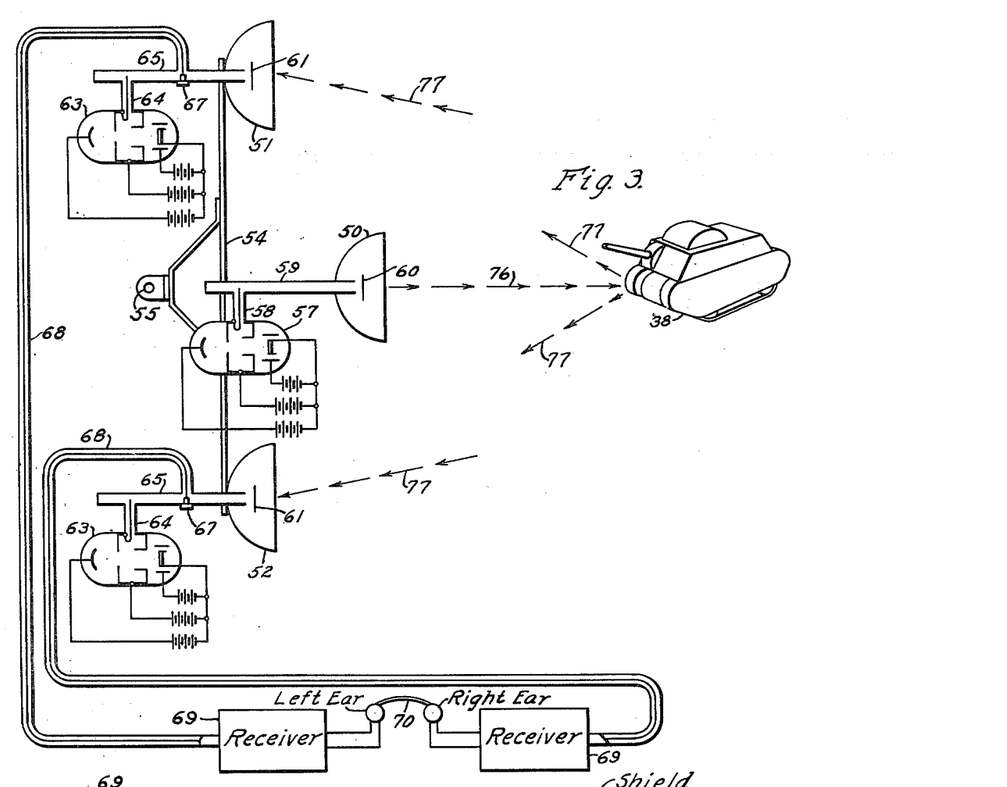
Fig. 3 is a schematic illustration of another embodiment, wherein high-frequency radio waves are utilized to determine the position of a distant object.
Figure 4:
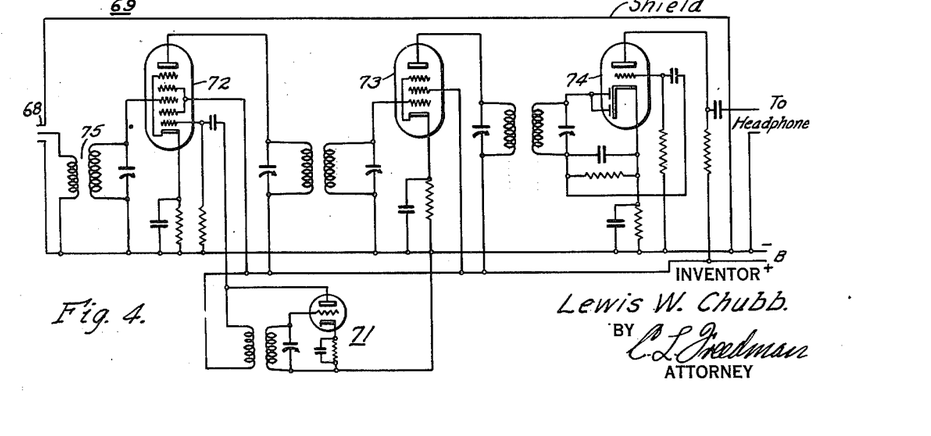
Fig. 4 is a schematic diagram of one of the receivers used with the apparatus illustrated in Fig. 3.

Figs. 3 and 4 of the drawings illustrate a second embodiment of this invention wherein continuous radio waves are utilized to accurately locate a moving distant object. This embodiment contemplates scanning the area which is believed to include the object with a highly directional beam of continuous radio waves. The waves, upon striking the object sought, are reflected back to a plurality of detectors or receivers near the source of direct waves. The reflected waves are then gathered and utilized to excite the binaural sense of the operator to accurately locate the position of the object sought.

The apparatus of this embodiment includes an antenna system comprising a parabolic transmitting reflector 50 and a pair of parabolic receiving or detecting reflectors 51 and 52 located at equal distances on opposite sides of the reflector 50. The transmitting reflector may be advanced in position relative to the receiving reflectors. The reflectors 50, 51 and 52 are all rigidly attached to a member 54 which is adapted to be rotated in azimuth about a point 55. The transmitting reflector 50 is supplied with continuous radio waves from a transmitter 57. This transmitter may be of any suitable design, but it is preferred to use a transmitter which is designed to generate short radio waves having a wave length, for example, of approximately 3 centimeters. For the purpose of illustration only, a transmitting oscillator of the "reflex klystron" type has been illustrated; however, an oscillator of the "magnetron" type will also serve the purpose. Both of these types of oscillators are well known in the art, and it is not believed necessary to describe the same in detail.

The transmitter 57 is located behind the transmitting reflector 50 and the waves from the transmitter are conducted to the reflector 50 through a coaxial cable 58 and a wave guide 59. The transmitting reflector 50 has a diameter of many times the wave lengths at which the apparatus operates. In this way, a highly directional beam of radio waves is produced. A small disc reflector 60 placed directly in front of the wave guide 59 causes substantially all of the transmitted waves to be reflected outwardly from the reflector 60.

The receiving reflectors 51 and 52 also have a diameter of many times the wave length at which the apparatus operates, and are preferably approximately of the same diameter as the transmitting reflector 50. A small disc reflector 61 is also located near the focus of each of the receiving reflectors 51 and 52.

A low power local oscillator 63 of the "reflex klystron" or "magnetron" type is located behind each of the receiving reflectors 51 and 52. The output from each of these oscillators is connected to its respective receiving reflector by a coaxial cable 64 and a wave guide 65. The small disc reflectors 61 cause substantially all of the reflected waves that return to the receiving reflectors to be directed into the wave guides 65. The frequency supplied by the local oscillators 63 is mixed with a portion of the direct waves and the reflected waves in the wave guides 65. It is understood that a suitable tie-in circuit may be provided to keep the two oscillators 63 in step.

A crystal detector 67 is positioned in each of the wave guides 65 to produce the beats resulting from the mixing of the direct waves, the reflected waves, and the waves supplied by the local oscillators 63. Each crystal is connected through a coaxial cable 68 to a receiver 69. The output from each receiver 69 is, in turn, connected, respectively, to one of a set of headphones 70 which are worn by the operator.

Both of the receivers 69 are identical, and for the purpose of illustration, only one receiver is illustrated in detail in Fig. 4. Each receiver includes a transformer 75, a local oscillator 71, a mixing tube 72, an intermediate-frequency amplifying tube 73, and a detector and audio-frequency amplifying tube 74. A suitable tie-in circuit may also be provided for keeping the two oscillators 71 in step.

To locate an object with this apparatus, the transmitting oscillator is set into operation to generate continuous radio waves. Some of these waves are directed directly into the reflectors 51 and 52; however, most of them are directed outwardly by the reflector 50 in a narrow beam, along the path indicated by the arrows 76 (Fig. 3). These waves, upon striking an object, such as a tank 38 (Fig. 3), are scattered and reflected back, along the paths indicated by the arrows 77, to the receiving reflectors 51 and 52. The reflected waves, along with the small amount of direct waves received directly from the transmitting reflector 50, are directed into the respective wave guides 65 by the disc reflectors 61. These direct and reflected waves are then mixed in the respective wave guides 65 with the oscillations supplied by the respective local oscillators 63.

The combination of waves in each wave guide 65 is detected by its respective crystal detector 67 to produce an intermediate frequency which is conducted through the respective coaxial cable 68 to the respective receiver 69. In the receiver 69, these intermediate frequencies are further mixed in the respective tubes 72 with the oscillations supplied by the respective local oscillators 71 to produce another set of lower intermediate frequencies. These lower intermediate frequencies are further amplified in the respective tubes 73, and then they are detected to produce an audio beat and further amplified in the respective tubes 74. The output from each of the tubes 74 is connected to one of the headphones of the set of headphones 70.

If the transmitting reflector 50 points directly at the tank 38 (Fig. 3), the receiving reflectors 51 and 52 will be equal distances from the tank and the reflected waves picked up by the reflectors 51 and 52 will be in phase. This causes the beat notes fed to the respective headphones 70 to be in phase and of equal magnitude. In this instance, the signal appears to remain stationary in the center of the operator's head, which indicates to the operator that the reflector is pointing directly at the tank.

If the transmitting reflector 50 is shifted, from pointing directly at the tank, so that it points slightly to the left of the direction of the tank, the receiving reflector 52 will be closer to the tank than the receiving reflector 51, and the reflected wave picked up by the reflector 52 will be slightly advanced in phase and the reflected wave picked up by the reflector 51 will be retarded in phase by an equal amount. The amount of phase shift is proportional to the difference in the echo paths from the tank 38 to the reflectors 51 and 52. In this instance, the signal appears to move from the center of the head of the operator to his right ear. Accordingly, if the transmitting reflector 50 is shifted from pointing directly at the tank, so that it points slightly to the right of the tank, the receiving reflector 51 will be closer to the tank than the receiving reflector 52, and the reflected wave picked up by the reflector 51 will be slightly advanced in phase and the reflected wave picked up by the reflector 52 will be slightly retarded in phase. In this instance, the signal appears to move from the center of the operator's head to his left ear.

To accurately focus the system on a distant object, the operator merely rotates the array of reflectors until a signal is received in the headphones 70. Then he manipulates the reflectors to the right or left until the signal remains stationary in the center of his head, which indicates to him that the transmitting reflector 50 is pointing directly at the object.

Although separate local oscillators 63 have been shown for each of the receiving reflectors 51 and 52, it is understood that a single oscillator may be used to supply both of the reflector with a frequency to heterodyne the received waves.

It has been found that good results can be obtained by using a transmitter frequency of 10.000 megacycles and beating the reflected wave with a frequency of 9,970 megacycles, which frequency is supplied by the local oscillator 63, and then beating the resultant beat frequency of 30 megacycles with a second frequency of 29.535 megacycles, which is supplied by the receiver oscillators 71. This gives a final beat point of approximately 465 kilocycles. This frequency is easy to amplify.

In some instances, both of the local oscillators 63 may be omitted. The reflected wave and the directly received wave will then be detected by crystal detectors 67 to produce an audible frequency directly which may then be amplified by conventional audio amplifiers and applied to headphones.

In some instances, for example, for the sake of economy, a single oscillator may be substituted for the two receiver oscillators 71. It is also understood that in some instances the receiver oscillators 71 may be omitted. The mixture of the direct waves, reflected waves, and oscillations supplied by the local oscillators 63 is then detected to produce an audible signal. This signal is then amplified and applied directly to the headphones 70.

Figure 4A:
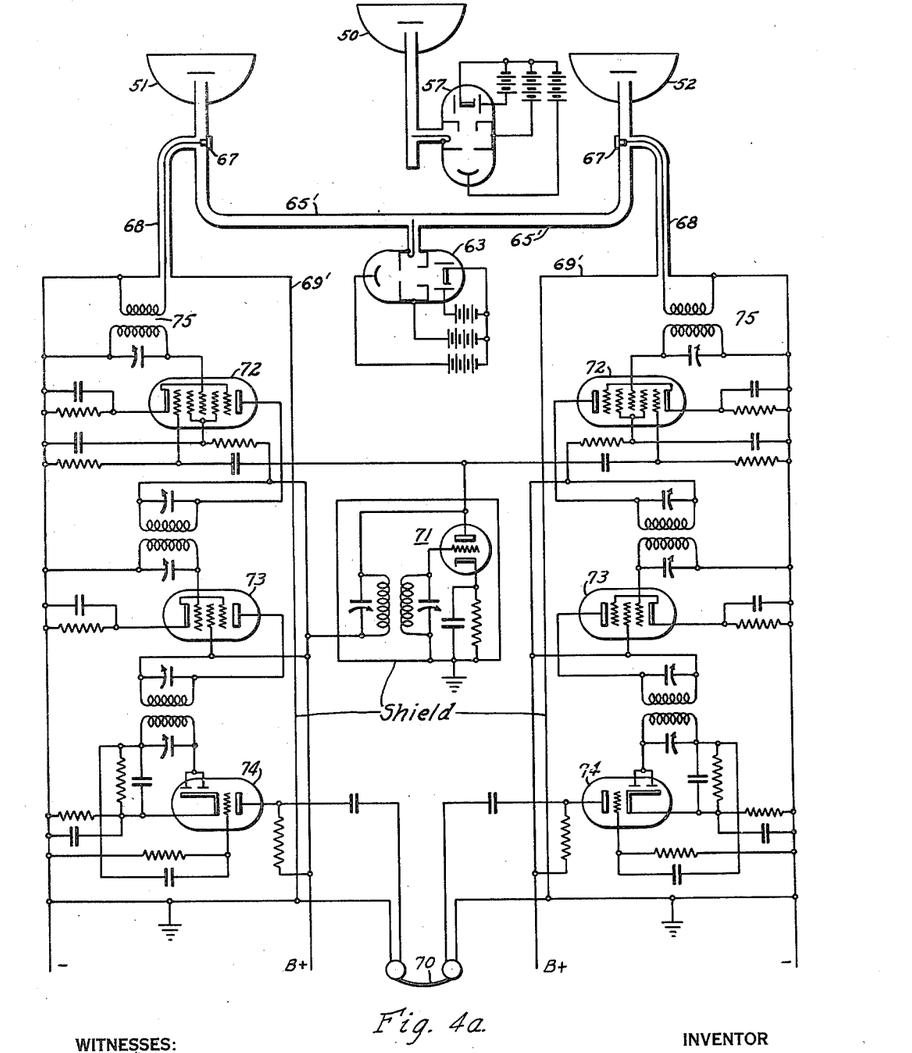
Fig. 4a is a schematic diagram of a modified form of the embodiment shown in Fig. 3.

For example, the system of Fig. 3 may be modified in the manner shown in Fig. 4a. Referring to Fig. 4a it will be observed that the system therein illustrated differs from the system of Fig. 3 only in the provision of a single high-frequency oscillator 63 and a single low-frequency oscillator 71 for modifying the signals received from both of the reflectors 51 and 52. The output of the high-frequency oscillator 63 is conducted through two wave guides 65' to the two crystal detectors. These wave guides 65' are adjusted to provide outputs from the oscillator which are in phase at the crystal detectors. The receivers 69' of Fig. 4a are similar to the receivers 69 except for the provision of the single oscillator 71 which delivers in-phase oscillations to the two mixing tubes 72.

Although this embodiment has been described for location in azimuth only, it is understood that it may be adapted for locating in elevation also.

Figures 7, 8:
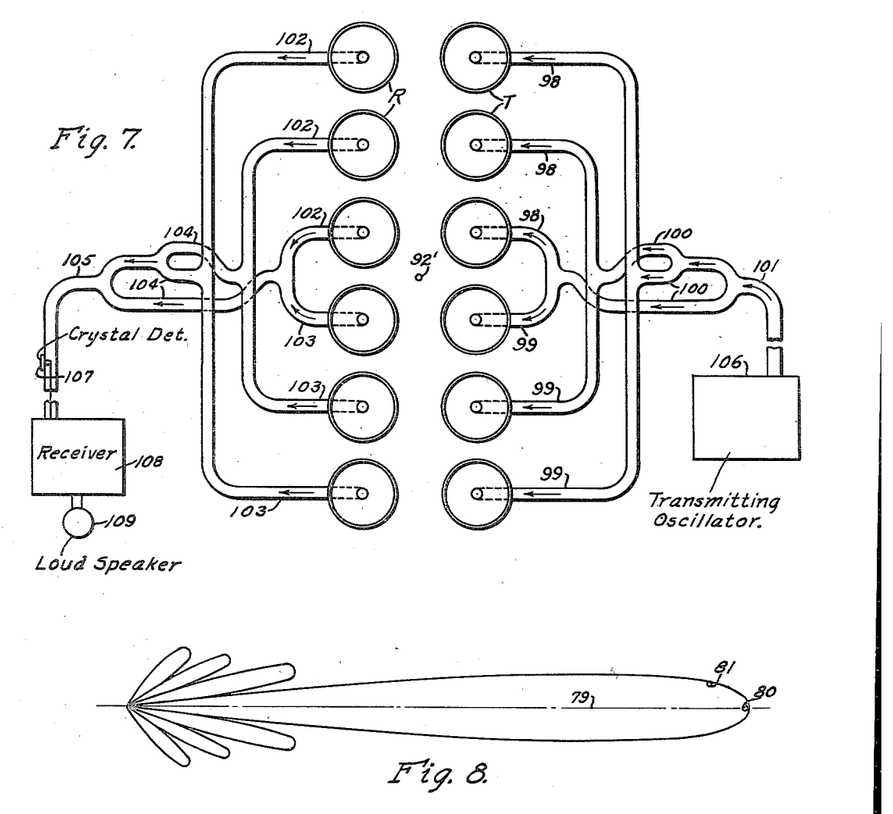
Fig. 7 is a diagrammatic view illustrating an arrangement wherein the antenna system shown in Figs. 5 and 6 is utilized.
Fig. 8 illustrates the pattern of the polar beam of each of the reflectors shown in Fig. 3. This figure also illustrates the pattern of the polar beam of the antenna system, shown in Figs. 5, 6 and 7, when the system is in the position indicated in Fig. 5.

Fig. 8 illustrates the polar beam for the transmitting reflector 50, it being understood that the polar beam of each of the receiving reflectors is substantially this same pattern. It is known that the polar beam of a 30 inch reflector transmitting a 3 centimeter wave is 3 or 4 degrees wide at half energy. When the reflector 50 is pointed, along the line 79, directly at an object, such as indicated by the dot 80 (Fig. 8), the receivers 69 will get a maximum signal and the binaural sense will indicate that the reflector 50 is pointed directly at the object 80. However, it is appreciated that, due to the width of the polar beam, when the member 54 is rotated so as to advance the receiving reflector 51 one-half transmitter wave length and retract the receiving reflector 52 one-half wavelength, or vice versa, there will be another maximum signal and the binaural sense will indicate that the reflector 50 is pointing directly at the object, thus giving an ambiguous signal on each side of the proper position. Accordingly, the receivers will also respond to a plurality of objects, such as indicated by the dots 80 and 81 (Fig. 8), which may fall within this wide polar beam, and the position of the object indicated by the binaural sense will not be a true position of either of the objects but will be a compromise position. This condition is objectionable where it is desired to very accurately locate an object for gun laying.

Figures 5, 6, 10:
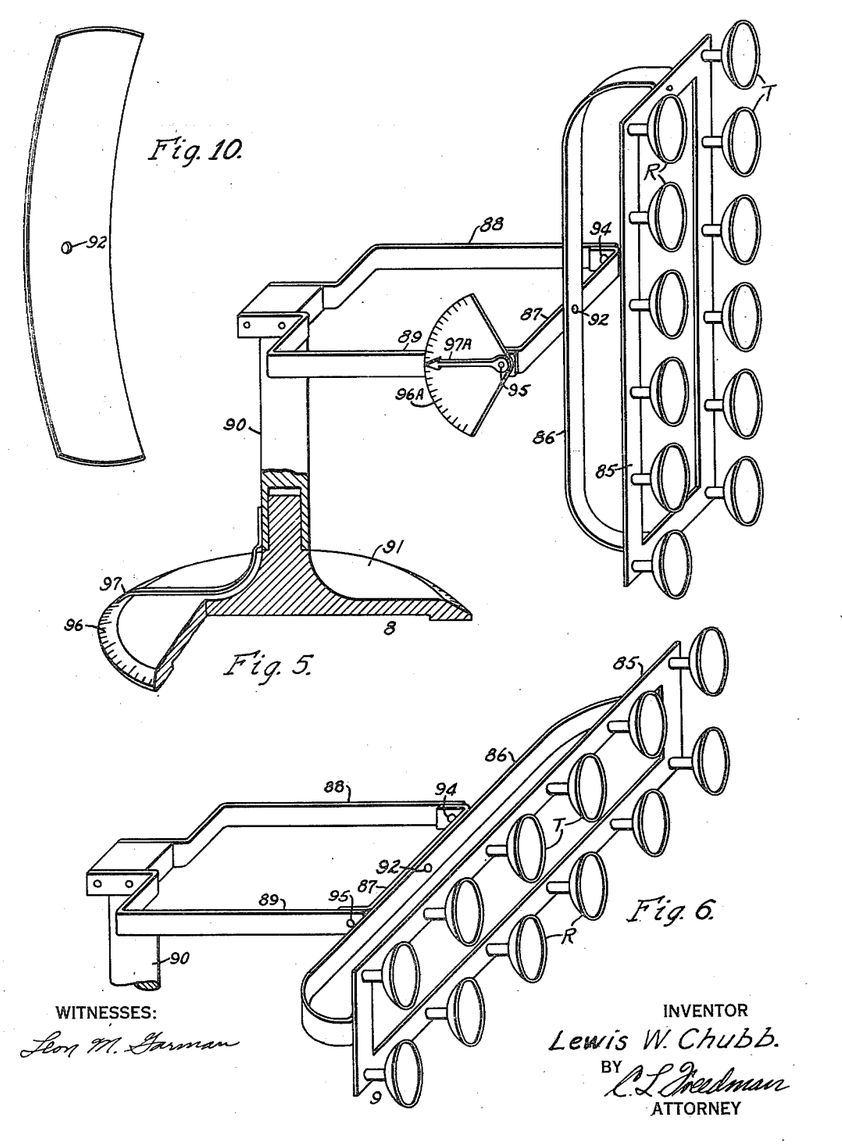
Fig. 5 is a side perspective view of an improved antenna system for use with high-frequency apparatus for determining the position of objects, the antenna system being positioned for approximate location of distant objects.
Fig. 6 is a partial perspective view of the apparatus shown in Fig. 5, with the antenna system positioned for more accurate location of distant objects.
Fig. 10 is a perspective view of an alternate form of reflector that may be used with the antenna system illustrated in Figs. 5, 6 and 7.

Figs. 5, 6 and 7 of the drawings illustrate an arrangement embodying an improved directive antenna system, where in the polar beams of both the transmitting and receiving reflectors are greatly sharpened or narrowed in at least one direction, so that when a receiver indicates a maximum signal, the transmitting parabola is focused directly on the object, thereby eliminating the ambiguous maximum signals that are obtained with a wide polar beam and also eliminating the compromise positions obtained from a plurality of objects. However, the polar beam of this system is fairly wide in one direction, which permits quick approximate location of objects. Modifications of this antenna system may be with either high-frequency sound-wave systems or high-frequency radio-wave systems.

The antenna system includes a row of transmitting reflectors T and a parallel row of receiving reflectors R mounted on a frame 85, which is connected by means of a U-shaped member 86 to another member 87, which, in turn, is connected to arms 88 and 89. The arms 88 and 89 are in turn attached to a standard 90, which may be rotated through 360 degrees about a base member 91. The U-shaped member 86 is pivoted to the member 87 at 92, which permits the frame 85, carrying the transmitting and receiving reflectors, to be rotated at least 180° about the pivot 92. The member 87 is pivoted to the arms 88 and 89, at 94 and 95, respectively. The pivots 94 and 95 permit the transmitting and receiving reflectors to be rotated at least 180° in elevation to focus the system in elevation.

It is intended that this antenna system be used in the position indicated in Fig. 5 to approximately locate in azimuth the object sought. When the antenna system is in this position, the resulting polar beam in azimuth of all of the transmitting reflectors is approximately the same width as the polar beam for a single transmitting reflector the same size as a single reflector T, it being understood that the resulting polar beam of all of the receiving reflectors is substantially the same pattern. If the reflectors T are the same size as the reflector 50 (Fig. 3), this polar beam will be the same as the diagram illustrated in Fig. 8. This beam is fairly wide, and it will be appreciated that the receiver will respond to multiple targets or objects, such as indicated by the dots 80 and 81 (Fig. 8), when two or more objects 80 and 81 are within the solid angle of the polar beam. However, such a compromise position is sufficient to give a quick approximate location of the object sought.

Figure 9:
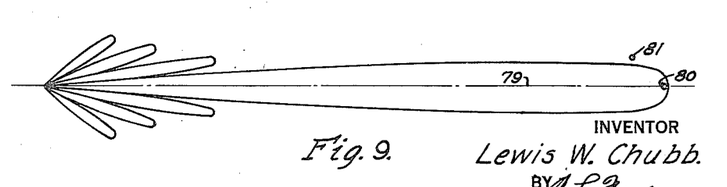
Fig. 9 illustrates the polar beam of the antenna system, shown in Figs. 5, 6 and 7, when the system is in the position indicated in Fig. 6.

After the object has been approximately located as described above and it is desired to accurately locate the same for sighting a gun or the like, the antenna system is rotated about the pivot 92 to the position shown in Fig. 6. In this position of the system, its polar beam is sharpened considerably in azimuth, as indicated by Fig. 9. This polar beam can be made approximately 2° or less at half energy, which is approximately twice as sharp as the beam illustrated in Fig. 8. This sharp polar beam permits focusing the system accurately on a single object, such as indicated by the dot 80, and near objects, such as indicated by the dot 81, will give little or no indication or signal.

It is realized that although the polar beam illustrated in Fig. 8 is not sharp in azimuth, it has the sharpness of the beam illustrated in Fig. 9 in elevation. However, it is thought to be a distinct advantage to locate an object in azimuth if its approximate elevation is known. For example, in order to easily locate an airplane near the horizon, the antenna system is positioned as indicated in Fig. 5. Then the system is rotated in azimuth about the base 91 until a signal is picked up. After the airplane has been approximately located in this manner, the antenna system is rotated about the pivot 92 to the position indicated in Fig. 6, and manipulated in azimuth about the base 91 until a maximum signal is obtained. This maximum signal indicates the accurate azimuth of the airplane.

With a finite number of pairs of parabolas, there will be several maximum signals. The first and greatest maximum will be when the phase of all of the reflected waves is the same. This condition exists when frame 85 (Fig. 6) is normal to the reflected waves. The next major maximum will be when the rows of reflectors have been rotated through an angle such that there is one wavelength difference in the paths of the reflected waves received by the pair of reflectors having the shortest radius from the pivot 92. These multiple maxima would ordinarily give some ambiguity to the results; however, such ambiguity will be eliminated because successive maxima to the side of the central maximum will be of diminishing amplitude because of the sharp directional effect of both the transmitting and receiving paraboloids, giving a diminished response when turned to the side.

It will be appreciated that the signal fed from an oscillator to the various transmitting paraboloids preferably should be of equal energy and of the same phase. This can be realized by using a wave guide system such as described hereinafter. In the receiving system, the various component signals from each receiving parabola must be summed vectorially before detection and each receiving parabola should feed a signal of equal amplitude to the wave guide system. The total signal then passing out through the final wave guide to the detector should be the vector sum of the various component waves picked up by the separate receiving paraboloids. This is accomplished as illustrated in Fig. 7.

This figure is diagrammatic only. However, when considering the same, it is assumed that the point 92′ corresponds to the pivot 92 shown in Figs. 5 and 6. It is seen from this figure that the transmitting reflectors of equal radius from the point 92′ are connected together by means of wave guides 98 and 99, which are fed from wave guides 100, which are in turn fed from a main wave guide or feed pipe 101, which connects to a transmitting oscillator 106. The arrangement of wave guides from the feed pipe 101 to each of the reflectors T is such that their impedances are matched and that their optical lengths are equal or differ by an integral number of wavelengths. Such an arrangement will feed an equal amount of energy to each reflector T, and they will all transmit in the same phase. Correspondingly, all of the pairs of receiving reflectors R of equal radius from the point 92′ are connected together by wave guides 102 and 103, which converge into wave guides 104, all of which converge into a main wave guide 105 for connecting the system to a crystal detector 107. The arrangement of the wave guides from each of the reflectors R to the main wave guide 105 is also such that their impedances are matched and that their optical lengths are equal or differ by an integral number of wave lengths. This wave guide system sums up vectorially the carrier frequency from all of the different pairs of reflectors before detection. The detector 107 is connected to a receiver 108. This receiver may be of the type shown in Figs. 3 and 4, or any other suitable type. The output from the receiver 108 is connected to an indicator 109 which shows the magnitude of the signal created by the reflected waves. The indicator 109 may be a speaker or head set by which the operator can distinguish the intensity of the audio signal, or it may be a cathode ray oscilloscope which will visually show the amplitude of the signal received.

By adjusting the radius and number of the various transmitting and receiving reflectors, almost any degree of sharpness of the polar beam can be obtained in one direction.

Although a plurality of parabolic reflectors have been shown and described for directing the transmitted waves and gathering the reflected waves, it is understood that a single reflector may be used for directing or gathering the waves without changing the scope of this invention. Fig. 10 illustrates a single reflector that may be substituted for each of the rows of reflectors shown in Figs. 5 and 6. This reflector is formed by cutting a central section from a large parabolic reflector. When this reflector is in vertical position, as indicated in Fig. 10, its polar beam is wide in azimuth, such as the beam illustrated in Fig. 8, but, after it is rotated through 90° or to horizontal position, its polar beam is narrow in azimuth, such as the beam illustrated in Fig. 9.

An important advantage of this antenna system is that when the system is in the position indicated in Fig. 5, the wide polar beam permits the object sought to be quickly approximately located in azimuth, and then after the object has been approximately located, the antenna system may be rotated about the point 92 to the position indicated in Fig. 6, in which position the object may be accurately located.

With the arrangement just described, it is the maximum signal that indicates when the transmitting reflectors are pointed directly at the object. However, it is understood that the binaural sense of the operator may be utilized to determine the position of the object. This may be accomplished by connecting all of the receiving reflectors on one side of the pivot 92' to one main wave guide and connecting all of the receiving reflectors on the opposite side to another main wave guide, then connecting the two main wave guides, through suitable receivers and headphones, to the two ears of an operator in the manner discussed for Figs. 3 and 4.

The apparatus described hereinbefore provides means for very accurately locating a distant moving object in azimuth, which permits of very accurate laying of guns, such as anti-tank guns and anti-aircraft guns which have a very flat trajectory, wherein the distance to the object does not have to be taken into consideration in laying the guns. However, if it is desired to also determine the distance from the locating apparatus to the object, a simple means for making such measurements may be provided by pulsing the wave generator or transmitter after the transmitting reflector has been accurately directed at the object and measuring the time that elapses between the projection of a pulse of direct waves and the reception of the reflected wave, by means known to those skilled in the art.

A simple and convenient means for indicating the direction of the object or its location in azimuth with respect to the position of the apparatus is illustrated in Fig. 5 by the scale 96 and pointer 97. It is understood that this arrangement is also applicable to the apparatus shown in Figs. 1 and 3. A similar scale 96A and pointer 97A are illustrated for indicating the position of the object in elevation. However, it is understood that any other suitable means may be substituted for the scales and pointers illustrated without changing the scope of this invention.

From the foregoing description, taken in connection with the drawings, it is seen that this invention provides improved apparatus for accurately locating the position of moving objects. This invention is especially useful for locating moving objects, wherein the object is not visible to the eye, such as the location of tanks, airplanes, ships or the like, at night, in smoke screens or fogs. This is permissible because of the fact that the sound waves and radio waves utilized will readily penetrate darkness, smoke screens, fog, and the like. It is also seen that, by utilizing the frequency of the received echo waves for heterodyning with the direct wave to produce a beat for exciting the binaural sense of the operator, a moving object may be readily distinguished from stationary objects, and its direction accurately determined. In effect, the frequency of the signals received by the two ears of an operator is dependent on the movement of the target or object, whereas the phase displacement between the signals applied to the two ears is dependent on the position of the antenna array with respect to the target or object.

I claim as my invention:

1. In apparatus for locating the position of an object which moves with respect to a place of observation, the combination of means for generating high frequency waves, means for directing a portion of said waves toward said object, means for gathering the waves reflected from said object at a plurality of points near said place of observation and mixing the same with a directly-received portion of said high frequency waves to produce beats at each of said gathering points, means for detecting said beats and feeding the same to the ears of an operator to excite the binaural sense of the operator, whereby the operator is informed of the position of said object with reference to said place of observation.

2. In apparatus for locating the position of an object which moves with respect to a place of observation, the combination of means for generating high frequency waves, means for directing a portion of said waves toward said object, means at at least two points at equal distances on opposite sides of said wave-directing means for gathering waves reflected from said object and mixing the same with a directly-received portion of said high frequency waves to produce beats at said gathering points, said wave-directing means and gathering means being adapted to be moved in unison to scan the area which is believed to include said object, means for detecting and amplifying said beats and feeding the same to the ears of an operator to excite the binaural sense of the operator to inform the operator of the position of said object with reference to said place of observation.

3. In apparatus for locating the position of an object which moves with respect to a place of observation, the combination of means for generating high frequency waves, means for directing a portion of said waves toward said object, means for gathering and mixing a portion of the waves reflected from said object with a directly-received portion of said high frequency waves at two points at equal distances on opposite sides of said wave-directing means to produce a beat at each of said points, means for detecting said beats and feeding the same to the ears of an operator to excite the binaural sense of the operator whereby the operator is informed of the position of said object in azimuth with respect to said wave-directing means, other means for gathering and mixing a portion of the waves reflected from said object with a portion of said direct waves at two points at equal distances on two other opposite sides of said wave-directing means to produce a beat at each of said points, means for detecting said beats and feeding the same to the ears of another operator to excite the binaural sense of the operator whereby the operator is informed as to the position of said object in elevation with respect to said wave-directing means.

4. The method of locating the position of an object which moves with respect to a place of observation, consisting in producing high frequency waves at the place of observation, directing said high frequency waves toward said object, gathering the waves reflected from said object at a plurality of points near said place of observation and mixing the same with a directly-received portion of said high frequency waves, utilizing the frequency difference between said directly-received high-frequency waves and said reflected waves which is caused by the movement of said object to produce a beat at each of said gathering points, detecting said beats and feeding the same to the ears of an operator to excite the binaural sense of the operator to inform the operator of the position of said object with reference to said place of observation.

5. In apparatus for locating the position of an object which moves with respect to a place of observation, the combination of means for generating high frequency sound waves, a reflector for directing a portion of said waves toward said object, a first pair of reflectors located at two points at equal distances on opposite sides of said wave-directing reflector for gathering a portion of the waves reflected from said object and mixing the same with directly-received portions of the high-frequency waves to produce a beat at each of said gathering points, a second pair of reflectors located at equal distances on two other opposite sides of said wave-directing reflector for gathering other portions of the waves reflected from said object and mixing them with directly-received portions of said high frequency waves to produce other beats at each of said second gathering points, said wave-gathering reflectors being located in the same plane and disposed equal distance and equal angularly about a centerline perpendicular to the plane, said wave-directing reflector being located on said centerline and forwardly of said plane, microphones in said wave-gathering reflectors for detecting said beats, amplifier means, means connecting said microphones to said amplifier means, and means for feeding the output from said amplifier means to the ears of operators to excite the binaural sense of the operators to inform them of the position of said object in azimuth and elevation with respect to said place of observation.

6. In apparatus for locating the position of an object which moves with respect to a place of observation, the combination of means for generating high-frequency radio waves, means for directing said waves toward said object in a narrow beam, means located at equal distances on two opposite sides of said wave-directing means for gathering waves reflected from said object, means for generating and mixing local oscillations of said high-frequency with said reflected waves to cause beats, and means for detecting said beats and feeding the same to the ears of an operator to excite the binaural sense of the operator to inform him of the position of said object with reference to said place of observation.

7. In apparatus for locating the position of an object which moves with respect to a place of observation, the combination of means for generating high-frequency radio waves, means for directing said waves toward said object in a narrow beam, means located at equal distances on at least two opposite sides of said directing means for gathering waves reflected from said object, said wave-directing and gathering means being adapted to be moved in unison to scan the area including the object, means for generating local oscillations of said high frequency for mixing with the reflected waves gathered at each of said points to cause beats, means for detecting said beats, a radio receiver, means connecting said detecting means to said receiver, said receiver including means creating oscillations for further mixing with said first beats to produce second beats and means for amplifying said second beats, and means for feeding the output from said receivers to the ears of an operator to excite the binaural sense of the operator to inform him of the position of said object with reference to said place of observation.

8. In apparatus for locating the position of an object which moves with respect to a place of observation, the combination of means for generating high frequency radio waves, means for directing said waves toward said object in a narrow beam, means located on two opposite sides of said wave-directing means and at equal distances therefrom for gathering waves reflected from said object, separate means for generating oscillations of said high-frequency for mixing with said reflected waves to produce a beat at each of said gathering points, means for detecting each of said beats, radio receivers, means for connecting each of said detecting means to one of said receivers, each of said receivers including means for mixing said beats with other oscillations to produce a second beat and means for amplifying said second beats, and means for feeding the output from said radio receivers to the ears of an operator to excite the binaural sense of the operator to inform him of the position of said object with reference to said place of observation.

9. In apparatus for locating the position of an object which moves with respect to a place of observation, the combination of means for generating high-frequency waves, means for directing said waves towards said object, means at a plurality of points at equal distances on opposite sides of said wave-directing means for receiving waves reflected from said object,, said wave-directing and gathering means being movable in unison for scanning the area including the object, means for generating and mixing oscillations of said high frequency with the reflected waves gathered at each of said points to produce a first beat at each of said gathering points, means for detecting said beats, means for generating and mixing other oscillations with said first beats to produce second beats, and means for feeding said second beats to the ears of an operator to excite the binaural sense of the operator to inform him of the position of said object with reference to said place of observation.

10. In apparatus for locating the position of an object with respect to a place of observation, the combination of means for generating high frequency waves, an antenna system for directing said waves towards said object and gathering the waves reflected from said object, said antenna system having a polar beam for at least one of the transmitted and reflected waves which is of less width in azimuth than in elevation, means for moving said antenna system between positions displaced angularly about a line extending in the direction of said polar beam, means for detecting the signal created by said reflected waves, and means for rendering said signal audible to an operator to inform the operator of the position of said object with reference to said place of observation.

11. In apparatus for locating the position of an object with respect to a place of observation, the combination of means for generating high frequency waves, an antenna system for directing said waves toward said object and gathering the waves reflected from said object, means for detecting the signal created by said reflected waves, means for rendering said signal audible to an operator to inform him of the position of said object with reference to said place of observation, said antenna system having a polar beam comparatively wide in azimuth when said antenna system is in one position which is utilized for approximately locating objects, said antenna system being adapted to be rotated from this position to another position in which latter position said polar beam is narrower in azimuth which enables said object to be very accurately located in azimuth.

12. In apparatus for locating the position of an object with respect to a place of observation, the combination of means for generating high frequency waves, an antenna system, said antenna system comprising a first row of parabolic reflectors for directing said waves toward said object and a second row of parabolic reflectors, parallel to said first row, for gathering the waves reflected from said object, said antenna system having a polar beam comparatively wide in azimuth when said rows of reflectors are in substantially vertical position, in which position said system is utilized for approximately locating objects, said system being adapted to be rotated from this position to a second position wherein the rows of reflectors are substantially horizontal, in which second position the polar beam of said system is substantially narrower in azimuth than when in said first position, which enables said object to be accurately located in azimuth, means for detecting the signal created by said reflected waves, and means for rendering said signal audible to an operator to inform him of the position of said object with reference to said place of observation.

13. In apparatus for locating an object which moves with respect to a predetermined station, means for producing at said station an alternating quantity having a predetermined frequency, said quantity comprising an alternating primary radiation of said predetermined frequency capable of reflection from said object, said radiation when incident on said object producing a reflected radiation having a frequency which differs from said predetermined frequency by an amount dependent on the rate of movement of the object in the line of travel of the incident radiation, means responsive to the beat frequency derived from the combination of said reflected radiation at a first point and said quantity for supplying an audible signal to a first ear of an operator, and means responsive to the beat frequency derived from the combination of said reflected radiation at a second point spaced from the first point and said quantity for supplying an audible signal to a second ear of an operator to excite the binaural sense of the operator, whereby the operator is informed of the presence of the object.

14. In apparatus for locating an object which moves with respect to a predetermined observation station, means at said station for generating an alternating primary radiation of predetermined frequency capable of reflection from said object, said means including means for directing said radiation in the form of a concentrated beam in a desired direction, a pair of radiation receivers located at equal distances on opposite sides of said radiation directing means for receiving radiation reflected by said object when the object is in the path of said beam, said reflelted radiation having a frequency which differs from said predetermined frequency by an amount dependent on the rate of movement of said object along the line of travel of said beam, said radiation receivers being positioned to receive radiation directly from said first-named means, separate means associated with each of said radiation receivers for producing an audible signal dependent on the beat frequency obtained by heterodyning said reflected radiation with radiation received directly from said first-named means, said audible-signal-producing-means including means for supplying the audible signals to the ears of an operator to excite the binaural sense of the operator whereby the operator is informed of the presence of said object.

LEWIS W. CHUBB.

REFERENCES CITED

The following references are of record in the file of this patent:

UNITED STATES PATENTS

| Number | Name | Date |
| --- | --- | --- |
| 1,889,614 | Rice | Nov. 29, 1932 |
| 1,973,673 | Rice | Sept. 11, 1934 |
| 2,018,463 | Muchow | Oct. 22, 1935 |
| 1,471,547 | Chilowsky et al. | Oct. 23, 1923 |
| 1,562,950 | Fessenden | Nov. 24, 1925 |
| 1,864,638 | Chilowsky | June 28, 1932 |
| 2,223,224 | Newhouse | Nov. 26, 1940 |

Disclaimer 2,416,155.—*Lewis W. Chubb*, Pittsburgh, Pa. POSITION LOCATOR. Patent dated Feb. 18, 1947. Disclaimer filed May 27, 1950, by the assignee, *Westinghouse Electric Corporation*.

Hereby enters this disclaimer to claims 1, 4, and 13 of said patent.

[*Official Gazette, Sept. 5, 1950.*]